United States Patent
Pogosyan et al.

(10) Patent No.: US 10,303,363 B2
(45) Date of Patent: May 28, 2019

(54) SYSTEM AND METHOD FOR DATA STORAGE USING LOG-STRUCTURED MERGE TREES

(71) Applicant: Acronis International GmbH, Schaffhausen (CH)

(72) Inventors: Vitaly Pogosyan, Moscow (RU); Kirill Korotaev, Moscow (RU); Mark Shmulevich, Moscow (RU); Stanislav Protasov, Moscow (RU); Serguei Beloussov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 409 days.

(21) Appl. No.: 15/297,774

(22) Filed: Oct. 19, 2016

(65) Prior Publication Data
US 2018/0107402 A1    Apr. 19, 2018

(51) Int. Cl.
*G06F 3/06* (2006.01)
*G06F 11/14* (2006.01)

(52) U.S. Cl.
CPC .......... *G06F 3/0608* (2013.01); *G06F 3/0641* (2013.01); *G06F 3/0673* (2013.01); *G06F 11/14* (2013.01)

(58) Field of Classification Search
CPC .. G06F 3/0608; G06F 16/137; G06F 16/1752; G06F 16/1748; G06F 12/08; G06F 16/22; G06F 3/0641; Y10S 707/99955
See application file for complete search history.

(56) References Cited

U.S. PATENT DOCUMENTS

| | | | | |
|---|---|---|---|---|
| 5,930,829 | A * | 7/1999 | Little | G06F 12/023 711/104 |
| 8,966,200 | B1 * | 2/2015 | Bushman | G06F 16/113 711/162 |
| 2011/0131387 | A1 * | 6/2011 | Bacik | G06F 12/023 711/171 |
| 2012/0072656 | A1 * | 3/2012 | Archak | G06F 12/0802 711/104 |

* cited by examiner

*Primary Examiner* — Yuk Ting Choi
(74) *Attorney, Agent, or Firm* — Arent Fox LLP; Michael Fainberg

(57) ABSTRACT

A system and method is provided for data storage using log-structured merge (LSM) trees. An example method includes storing data blocks for a number of files backup data files in a data archive, storing data values and corresponding segment identifiers for each data block in a first LSM tree, and storing the segment identifiers and associated physical addresses for each data block in a second LSM tree. The method further includes determining that one or more data blocks is no longer referenced by the backup data file and storing, in a third LSM tree, the physical address of the unused space in the data archive. Finally, the method includes copying data blocks from the end of the data archive to unused memory space at the physical address in the data archive and then deleting these data block at the end position of the archive to truncate the archive.

22 Claims, 11 Drawing Sheets

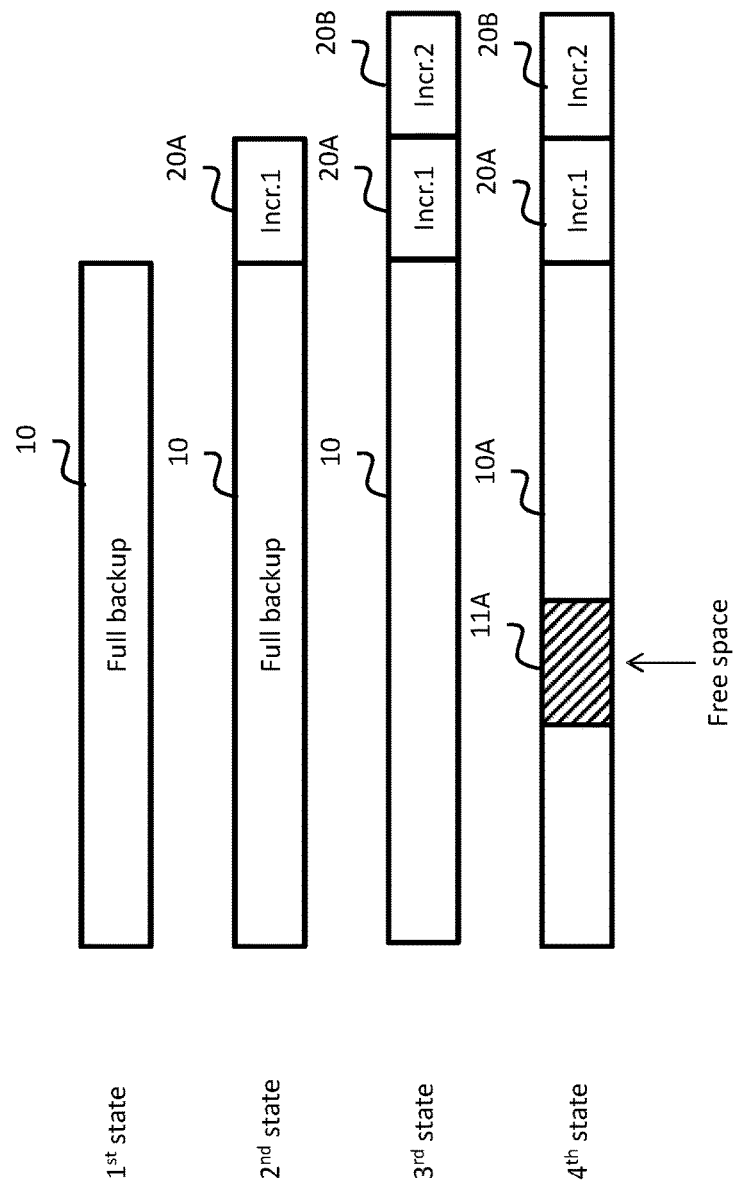

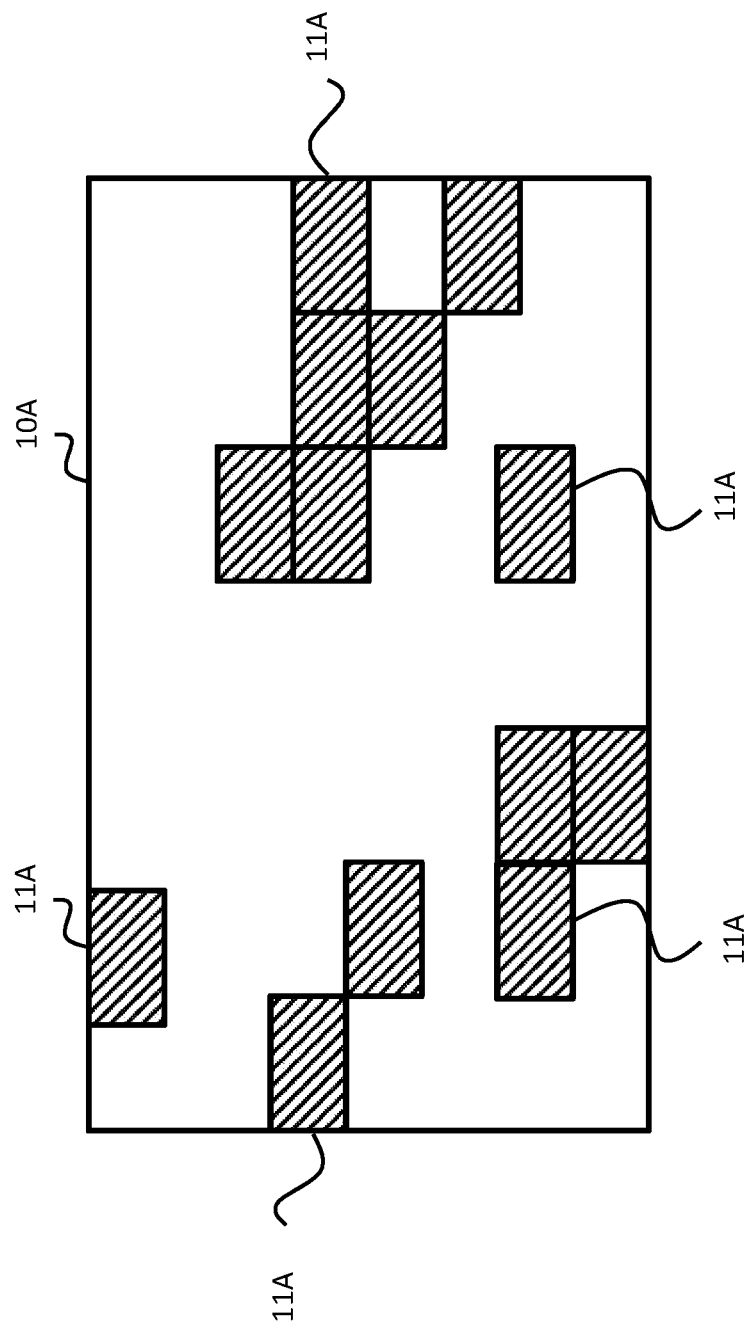

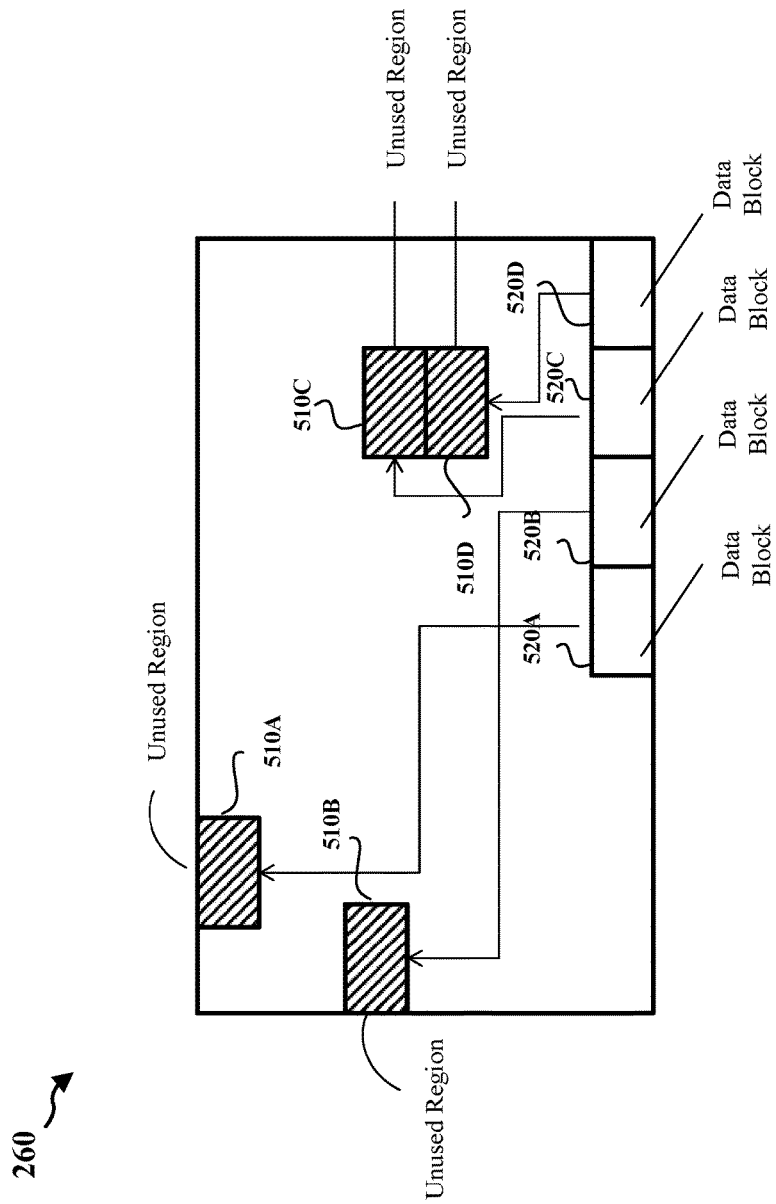

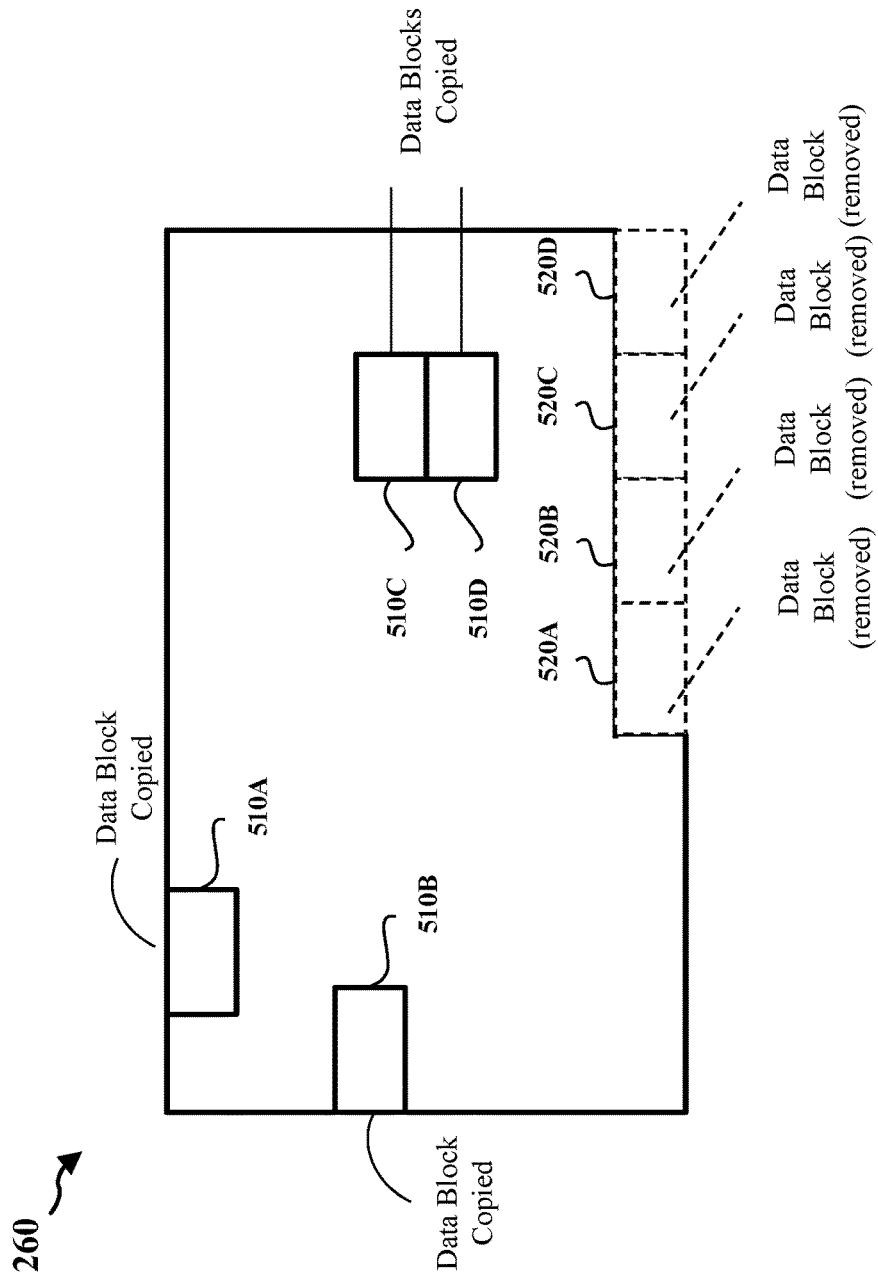

SYSTEM AND METHOD FOR DATA STORAGE USING LOG-STRUCTURED MERGE TREES

TECHNICAL FIELD

The present disclosure relates generally to the field of data backup, and more specifically to a system and method for data storage using log-structured merge trees.

BACKGROUND

Modern corporate enterprises have large volumes of critical data, such as work documents, emails, and financial records, that requires backup and recovery to prevent data loss. During a typical backup procedure, data stored on client workstations and servers is sent to a backup storage. During a typical recovery procedure, backup data is retrieved from the backup storage and reconstructed on client workstations and servers. Since the amount of data that requires backup can be very large, which even for a medium-size company can be measured in hundreds of terabytes, the backup process can be very resource intensive and time consuming. Furthermore, since the data backup process must be performed frequently, e.g., daily, semi-weekly, the backup process can be quite onerous on the corporate network.

FIG. 1A illustrates a conventional process for data backup process of a computer file. As shown, in a first state a full data backup 10 is created of the system, computer, and/or the like. Next, in a second state, a first increment 20A of all new and/or modified data is added to the archive, i.e., appended to the end of the data backup 10. Next, in a third state, a second increment 20B of all new and/or modified data is added to the archive. This process is repeated continuously. A fourth state is also shown in which a portion of the data 11A in the original backup 10 is no longer needed. This data portion 11A can be removed from the archive leaving a fragmented file 10A with randomly spaced occupied and unoccupied blocks. Over time, a large percentage of free space can actually be wasted and the speed for accessing such fragmented files 10A, for example, when reading or searching data, can be slowed down considerably.

FIG. 1B illustrates an exemplary fragmented file 10A resulting from the backup process described above. As shown, the fragmented file 10A can have many unused sectors 11A (shown as the cross-hatched boxes). These unused sectors 11A are obviously a considerable waste of resources that can lead to overly expensive data storage and also increasingly slow access times of the remaining usable data.

Existing solutions to address the problems of such fragmented file include sparsing operations that removed unused sectors within data files (e.g., fragmented filed 10A). However, sparsing algorithms have limitations. For example, the file system of the archive may not support the sparsing operations. Moreover, if the file is transferred from the archive with a file system that supports sparsing to another location that does not support sparsing operations, the unused regions in the "sparse" file are filled with digital zeroes. Furthermore, even in file systems that support sparsing (e.g., New Technology File System or "NTFS"), the use of sparsing functions may be accompanied with a number of restrictions so that the benefit of sparsing is not always realized.

Therefore, there exists a need to reduce the overhead (e.g., time, system resources, etc.) associated with searching for existing blocks and adding new blocks.

SUMMARY

Thus, a system and method is provided for data storage using log-structured merge (LSM) trees. According to one aspect, a computer-implemented method is provided for data backup. In this aspect, the method includes storing, in a data archive, a plurality of data blocks for backup data files; storing, in a first log-structured merge (LSM) tree, hash values for each of the plurality of data blocks and corresponding segment identifiers for each of the hash values; storing, in a second LSM tree, the segment identifiers for each of the hash values and associated physical addresses in the data archive for each of the plurality of data blocks; determining, by a processor, that at least one of the plurality of data blocks is no longer referenced by all of the backup data file; storing, in a third LSM tree, the physical address in the data archive of the at least one data block that is no longer referenced by all of the backup data files; copying at least one of the plurality of data blocks at an end position of the data archive to memory space at the physical address in the data archive identified in the third LSM tree; and deleting the at least one data block at the end position of the data archive to truncate the data archive.

According to another aspect, the method includes storing, in the second LSM tree, a count value for each of the segment identifiers, wherein the count value indicates a number of backup data files that reference the respective data block associated with the corresponding segment identifier.

According to another aspect, the method includes receiving, at least one additional data block for an additional backup data file; creating a hash value of the at least one additional data block; searching, in the first LSM tree, for a corresponding hash value of the created hash value of the at least one additional data block; and upon finding an existing hash value in the first LSM tree that matches the created hash value of the at least one additional data block, increasing the count value by 1 in the second LSM tree that corresponds to the segment identifier associated with the existing hash value.

According to another aspect, the method includes decreasing the count value by one upon receiving a notification that one of the backup data files no longer references the respective data block associated with the corresponding segment identifier.

According to another aspect, the determining that the at least one data block is no longer referenced by all of the backup data file comprises determining that the count value of the segment identifier associated with the physical address of the at least one data block is zero.

According to another aspect, the method includes deleting, from the first LSM tree, the hash values and the corresponding segment identifiers for each of the plurality of data blocks that is determined to no longer being referenced by all of the backup data file; and deleting, from the second LSM tree, the segment identifiers and the corresponding physical addresses for each of the plurality of data blocks that is determined to no longer being referenced by all of the backup data file.

According to another aspect, the method includes deleting, from the third LSM tree, the physical address in the data archive of the at least one data block that is no longer referenced by all of the backup data file after the at least one of the plurality of data blocks at the end position of the data archive has been copied to the memory space at the physical address in the data archive.

According to another aspect, a system is provided for data backup. In this aspect, the system includes a data archive configured to store a plurality of data blocks for backup data files; and a processor configured to store, in a first log-structured merge (LSM) tree, hash values for each of the plurality of data blocks and corresponding segment identifiers for each of the hash values, store, in a second LSM tree, the segment identifiers for each of the hash values and associated physical addresses in the data archive for each of the plurality of data blocks, determine that at least one of the plurality of data blocks is no longer referenced by all of the backup data file, store, in a third LSM tree, the physical address in the data archive of the at least one data block that is no longer referenced by all of the backup data files, copy at least one of the plurality of data blocks at an end position of the data archive to memory space at the physical address in the data archive identified in the third LSM tree, and delete the at least one data block at the end position of the data archive to truncate the data archive.

According to another aspect, a non-transitory computer readable medium is provided that includes computer executable instructions for performing data backup. In this aspect, instructions are provided for storing, in a data archive, a plurality of data blocks for backup data files; storing, in a first log-structured merge (LSM) tree, hash values for each of the plurality of data blocks and corresponding segment identifiers for each of the hash values; storing, in a second LSM tree, the segment identifiers for each of the hash values and associated physical addresses in the data archive for each of the plurality of data blocks; determining that at least one of the plurality of data blocks is no longer referenced by all of the backup data file; storing, in a third LSM tree, the physical address in the data archive of the at least one data block that is no longer referenced by all of the backup data files; copying at least one of the plurality of data blocks at an end position of the data archive to memory space at the physical address in the data archive identified in the third LSM tree; and deleting the at least one data block at the end position of the data archive to truncate the data archive.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

FIG. 1A illustrates a conventional process for data backup of a computer file.

FIG. 1B illustrates an exemplary fragmented file 10A resulting from the backup process described above.

FIGS. 5A-5C depict block diagrams of a memory subjected to the compacting algorithm according to an exemplary method using log-structured merge trees as described herein.

DETAILED DESCRIPTION

Figure 2:
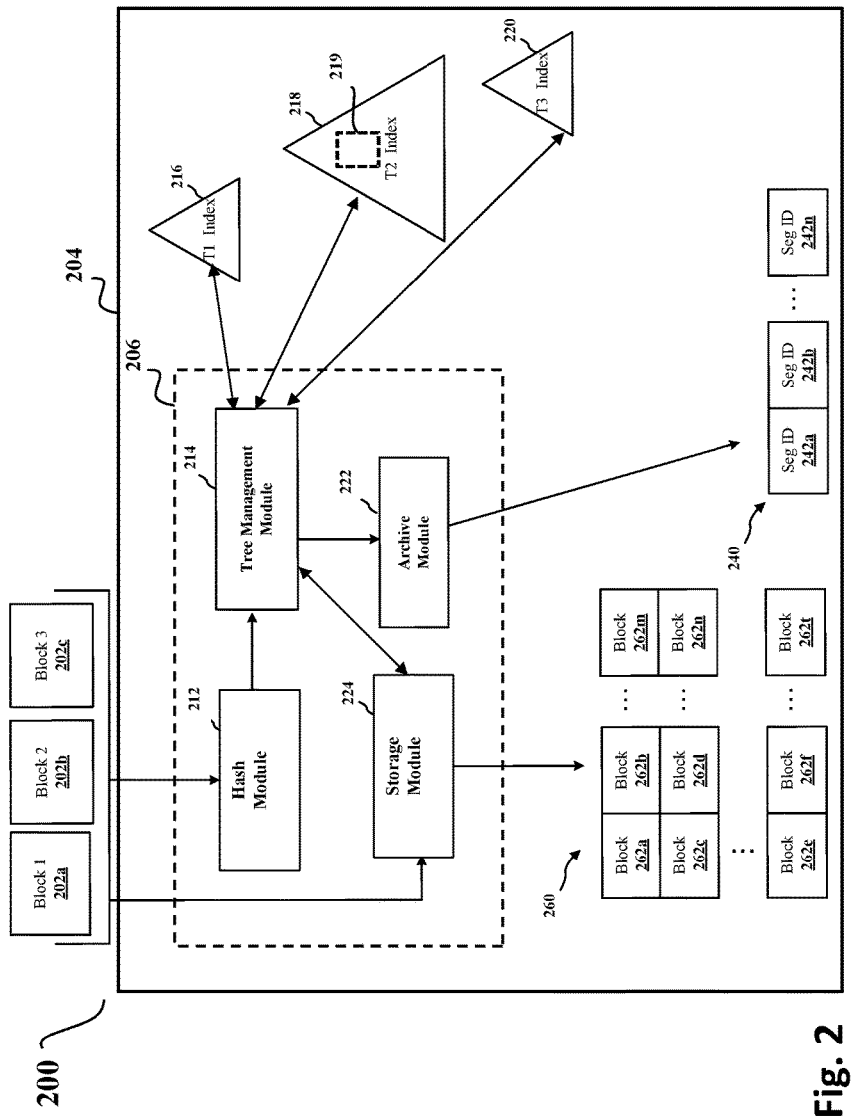
FIG. 2 illustrates a block diagram of a system for data storage using log-structured merge trees according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

FIG. 2 illustrates a block diagram of a system for data storage using log-structured merge trees according to an exemplary aspect. In general, the exemplary system uses a number of log-structured merge ("LSM") trees to store transactional log data of each data file stored in an archive using the exemplary algorithms described herein. In its simplest form, an LSM tree can be a data structure that has at least two levels (e.g., $C_0$ and $C_1$). New records may be inserted into a first level (e.g., $C_0$) and when insertion causes that first level to exceed a threshold, one or more records may be moved from the first level to a second level (e.g., $C_1$).

In the exemplary aspect, LSM trees can be used as an index for data storage and backup, in the context of data deduplication, for example. Data deduplication refers to a data compression technique that offers a reduction in the amount of duplicate data (e.g., a same bit sequence or byte sequence). For deduplication, unique blocks of data are identified and stored. As new blocks arrive, the backup system determines if the new block matches a stored block. If the new block does match a stored block, a reference (e.g., pointer) is provided for the new block that indicates the data is available at the stored block. If the new block does not match a stored block, the new block is stored so that further blocks may be compared against it.

According to the exemplary aspect, system 200 can include a data backup system 204 that can receive data designated for backup and divide that data into blocks (e.g., "chunking"). For example, it is contemplated that the data is divided into three blocks 202a, 202b and 202c and then provided to the data backup system 204. Although the data is shown to be divided before being input to data backup system 204, it should be appreciated that in an alternative embodiment, the data backup system 204 can be configured to perform this function, by segmenting (i.e., dividing) a data file into to defined size (e.g., 10 Mb) blocks, for example. Moreover, while three separate blocks are shown, the number of blocks is only provided as one example and should not be so limited. Furthermore, it will be appreciated that while the system 200 illustrates a plurality of components, additional components may be included and/or illustrated components may be omitted or combined. Further, connections between various components are intended to be illustrative and different approaches to communication between components may be employed in the system 200. While the system 200 is described in the context of a backup operation, other implementations are comprehended herein (e.g., data caching using the system 200 may increase the speed of working with data).

As shown, the data backup system 204 includes a data management module 206 that includes a plurality of sub-modules configured to perform the exemplary algorithms disclosed herein. According to one aspect, the data management module 206 includes software code (e.g., processor executable instructions) in memory, which may be configured to receive the data files for storage (i.e., blocks 202a-202c) and manage the indexing of LSM trees 216, 218 and 220. For example, it is contemplated that the data backup system 204 can include a computer-processing unit ("CPU") for executing the processes of data management module 206 to receive the data files and updated indexes in the LSM trees accordingly. Moreover, it is contemplated that while the exemplary aspect of FIG. 2 illustrates that data backup system 204 includes the data management module 204 and segment store 260 and/or archive 240 (which will be described below), it is contemplated that data management module 204 can be implemented on a separate server remotely coupled to data archives.

In one aspect, the data backup system 204 includes a segment store 260 that is provided to store a plurality of data blocks 262. The segment store 260 may be persistent storage and may include any suitable storage medium, such as hard disk drive (HDD), magnetic tape, and/or the like. The data backup system 204 can further include an archive 240 that is provided to store a plurality of segment identifiers ("IDs") 242. Each segment ID 242 may be a reference to a data block 262 in the segment store 260 (e.g., segment ID 242a may reference block 262a) and so forth. The archive 240 may be stored in persistent memory (although not necessarily the same persistent memory as the segment store 260), such as on disk.

As noted above, the data backup system 204 includes the data management module 206 with a number of sub-modules including hash module 212, tree management module 214, archive module 222 and storage module 224. As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

Upon receipt of each data block (e.g., blocks 202a, 202b and/or 202c), the hash module 212 is configured to calculate a hash for each data block. In an aspect, the backup system may use a SHA1 method to calculate the hash for a data block, in which each hash may be 20 bytes, for example. In another aspect, the backup system may use a SHA256 algorithm to calculate a hash, in which case each hash may be 32 bytes, for example. Moreover, as noted above, archive 240 is provided to store a plurality of segment IDs 242. In this aspect, the tree management module 214 is configured to receive and/or generate a segment ID for each newly added block to segment store 260. In one aspect, the segment IDs can be sequential and assigned to adjacent data blocks (e.g., "data locality") in order to reduce the number of random disk accesses in a search for a matching data block. Moreover, the tree management module 214 can control the archive module 222 to store the segment IDs in archive 240 as shown.

As further shown, the data blocks (e.g., blocks 202a, 202b and/or 202c) are provided to storage module 224, which, in turn, is configured to store each data block 202a-202c in segment store 260 as corresponding data blocks 262a to 262n, and so forth. Moreover, storage module 224 is configured to communicate the physical offset of each block 262a to 262n in segment store 260 to tree management module 214.

According to the exemplary aspect, the backup system 204 can employ at least three LSM tree data structures. Advantageously, the three LSM trees may offer the quick addition of new data and, additionally, may reduce the time consumed searching for data that is already archived. Such an approach may reduce the time consumed by a deduplication process during the backup process, for example, by reducing the number of read and/or write operations on disk. According to the exemplary aspect, at least one of the LSM trees may be stored in volatile memory (e.g., random-access memory) to reduce the time consumed by searching the LSM tree. It should be understood that all three LSM trees can be stored in volatile memory and/or in persistent memory.

In any event, the first tree ("T1 Index") 216 is provided as a data structure that can be associated with an index for blocks 262 in the segment store 260. In this aspect, first LSM tree 216 is configured as an index table, for example, that associates data values (e.g., hash values) of data blocks (e.g., generated by hash module 212) with segment IDs for those blocks. Thus, upon receipt of each block of data, the backup system 204 is configured to check a new hash against the indexed hashes 102 to determine if the new data block is unique. If the new data block is unique, the new hash is added to the indexed hashes in first LSM tree 216. It should be appreciated that while the exemplary embodiment generally describes the first tree 216 has storing hash values relating to the data blocks, other types of data values representative of the data blocks (or the data blocks themselves, i.e., data deduplication) can be stored in first tree 216.

Figure 3:
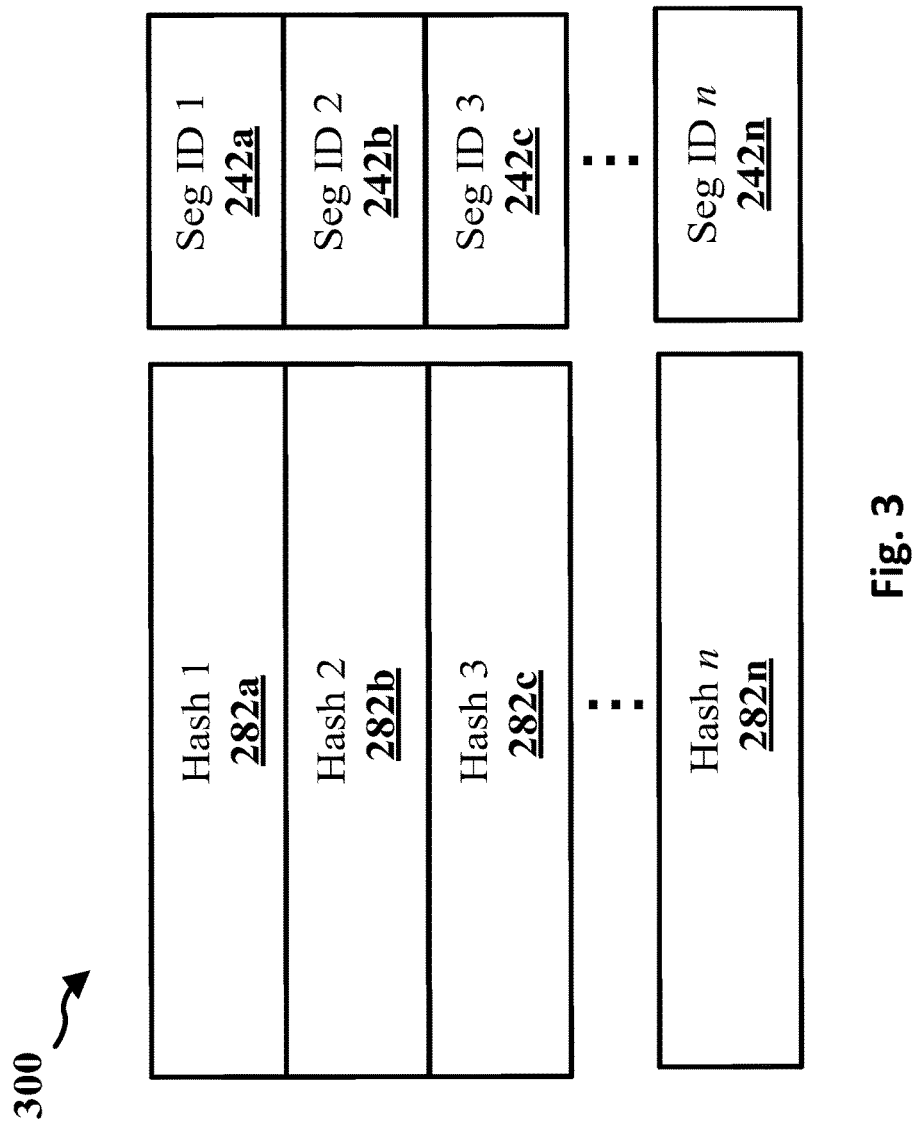
FIG. 3 illustrates an example of the data structure of a first LSM tree used in the system for data storage using log-structured merge trees according to an exemplary aspect.

FIG. 3 illustrates an example of the data structure 300 of first LSM tree 216 (i.e., a "deduplication tree") according to an exemplary aspect. As shown, the index table includes two columns with a first column providing hash values and a second column providing corresponding segment IDs. Thus, in one aspect, hash 1 (i.e., hash 282a) can be the created for data block 262a and having segment ID 1 (i.e., segment ID 242a), hash 2 (i.e., hash 282b) can be the created for data block 262b and having segment ID 2 (i.e., segment ID 242b), and so forth.

Referring back to FIG. 2, upon receiving a hash value, tree management module 214 is configured to access and search LSM tree 216 to determine whether the new hash generated by hash module 212 is unique. If the new data block is unique, the backup system 204 adds the new data block to storage and determines an offset of the new data block in the storage (e.g., an offset from a beginning address of an archive file). The offset may be 8 bytes. In one aspect, the data block may be sent to storage module 224 and stored in a queue. Upon receiving a control signal from tree management module 214 indicating this data block is indeed a new data block, the storage module 224 will then store the data block in segment store 260.

For example, the storage module 224 may write the first data block 202a to the segment store 260—e.g., the first block 202a may be written as block 262t in the segment store 260. Based on the newly added block 262t, the storage module 226 may determine an offset for the block 262t, such as an offset from a beginning physical address of the block 262t in the segment store 260 or an offset from a beginning block 262a in the segment store 260. The storage module 226 may provide this offset to tree management module 214. As described above, tree management module 214 can generate a segment ID in association with the newly added block 262t. The tree management module 214 may add a record to the first LSM tree 216 that indicates a mapping from the segment ID to the first hash value. As a result, tree management module 214 may then increase the size of the index table in the first LSM tree 216 as the new data block (i.e., the corresponding hash value and segment ID) is added to the index table by tree management module 214.

In one aspect, the tree management module 214 is configured to generate a segment added for the newly added block 262t by incrementing a previous segment ID (e.g., the segment ID of a unique data block 262n added to the segment store 260 immediately before the newly added block 262t). Thus, the segment IDs may be sequential and may reflect the order in which blocks 202 are added during backup. Thus, when reading large files (e.g., video), which consist of the blocks 262, the time required to identify duplicate data may be reduced by data locality—that is, adjacent blocks (e.g., block 262a and block 262b) may have sequential segment IDs (e.g., segment ID 242a and segment ID 242b).

As further shown, a second LSM tree 218 (i.e., a "D-Map tree") is provided and may also be associated with an index for blocks 262 in the segment store 260. In an exemplary aspect, the LSM tree 218 may be in persistent storage (e.g., on disk, in non-volatile memory) rather than in the volatile memory as is first LSM tree 216. Moreover, LSM tree 218 is configured to store each segment ID with a corresponding physical address in the segment store 260 (e.g., an offset from a beginning address of a file in the segment store 260 or an offset from a first data block 262a in the segment store 260). As noted above, the storage module 224 is configured to provide the physical offset to the tree management module 214 once the data block is stored in segment store 260.

Further, tree management module 214 is configured to add a record to the second LSM tree 218 that indicates a mapping from the physical offset to the corresponding segment ID in archive 240. In turn, tree management module 214 is configured to store, as an index table, the segment IDs and corresponding physical addresses. Accordingly, tree management module 214 may quickly search to determine whether a next block 202b matches the newly added block 262t. A similar process as described with respect to first block 202a may then be repeated for all remaining blocks 202b, 202c during a backup operation.

Thus, each block of data stored in segment store 260 has a corresponding segment ID. According to an exemplary aspect, the tree management module 214 is further configured to keep a count of references to this segment ID. In general, different backup files/systems may refer to the same block of data that can be present in both backup files/systems. Using deduplication, it is contemplated that only a single copy of this block is stored in segment store 260. Thus, each subsequent time a data block is received by data backup system 204 and a hash value is generated by hash module 212, the tree management module 214 accesses LSM tree 216 to determine if a copy of the block already exists or is new, as described above. In this aspect, LSM tree 218 includes a reference count 219 that corresponds to a segment ID (e.g. Seg IDs 242a-242n.

Figure 4:
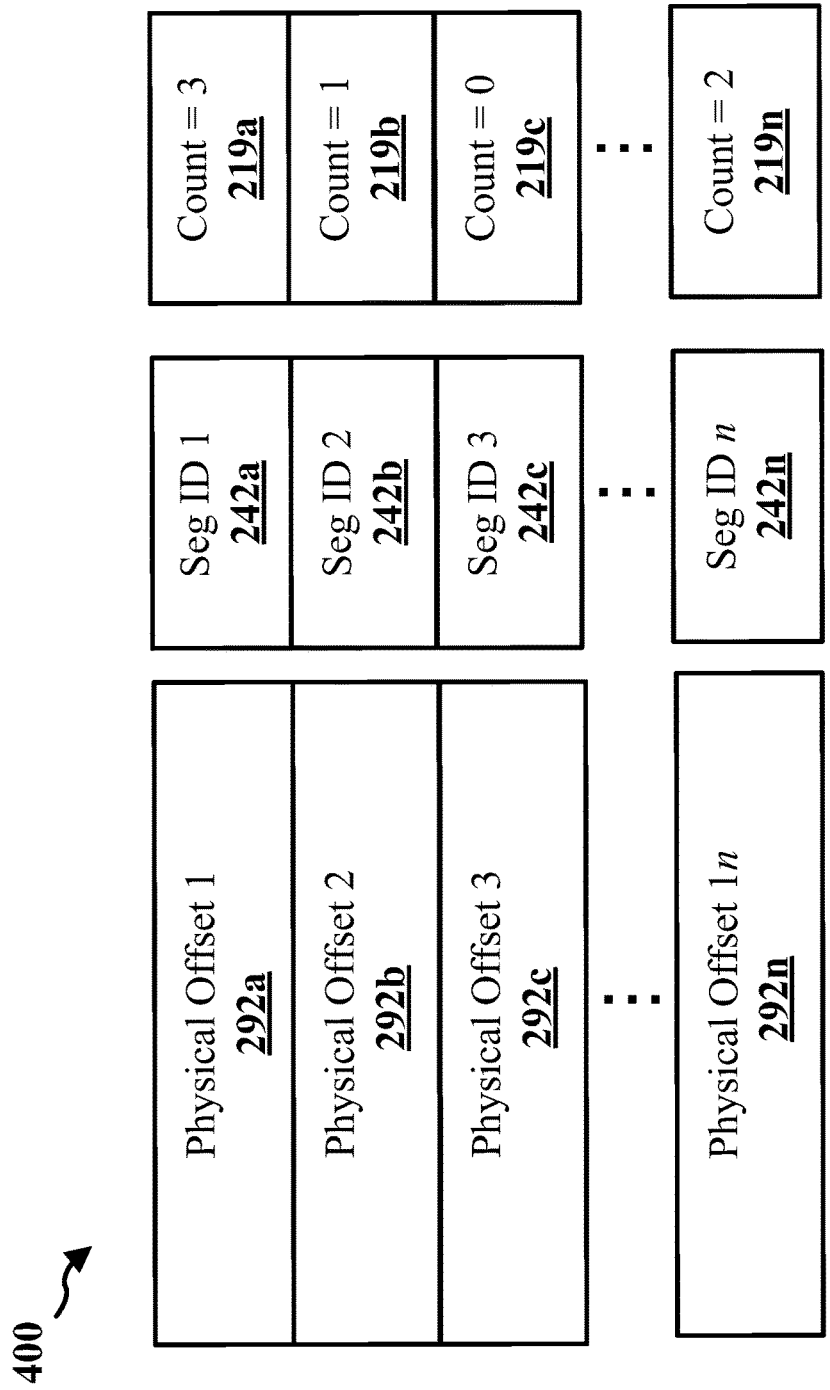
FIG. 4 illustrates an example of the data structure of a second LSM tree used in the system for data storage using log-structured merge trees according to an exemplary aspect.

FIG. 4 illustrates an example of the data structure 400 of the second LSM tree 218 (i.e., a "D-Map tree") according to an exemplary aspect. As shown, the index table includes three columns with a first column providing the physical offsets 292a through 292n, the second column provided the corresponding segment IDs 242a through 242n, and the third column providing the count number 219 for each segment ID. In this aspect, the tree management module 214 is configured to continuously update the counters for each segment ID each time it is referenced by a backup file/system. For example, segment ID 1 (i.e., segment ID 242a) has a count 219a of 3, segment ID 2 (i.e., segment ID 242b) has a count 219b of 1, segment ID 3 (i.e., segment ID 242c) has a count 219c of 0, and segment ID n (i.e., segment ID 242n) has a count 219n of 2. In other words, this is the number of times the data block stored in the corresponding physical offset (e.g., physical offsets 292a through 292n) in segment store 260 are linked to a backup file.

Accordingly, each time a new data block is received, the tree management module 214 determines if the backup is already stored in in segment store 260 and updates the count accordingly. For example, three (i.e., count 219a) separate backup files including/referencing the data block stored at physical offset 1 (e.g., offset 292a), which is referenced by segment ID 1 (i.e., segment ID 242a). Moreover, each time a backup file is deleted, the count is decreased by one. In other words, it is contemplated that the data backup system 204 receives a command that a backup file is to be deleted from the data management system of the enterprise, for example, and adjusts the count value in response thereto. Accordingly, the system 200 tracks the reference counter stored in tree (T2 index) 218. When the value for any block=0, the system knows that it can delete this block. In other words, since there are no any links (references) to a data block, the system can delete the record about this block in T1 and the T2 index trees.

In this case, the data management module 206 receives an instruction that a given backup file is no longer needed. Tree management module 214 determines the hash value for the one or more blocks of this file and then accesses LSM tree 216 to identify the corresponding one or more segment IDs for this file. The tree management module 214 then accesses LSM tree 118 and identifies the corresponding segment ID stored in LSM tree 118. The tree management module 214 then decreases the count 219 for that segment ID by "1". If the number of references to that segment ID reaches a count "0" (e.g., count 219c), tree management module 214 concludes that this block is no longer being used by any data backups. As a result, tree management module 214 can then send an instruction to storage module 224 to delete the data block from segment store 260 in aspect. In alternative aspect, the tree management module 214 can mark the data as unused, but leave the data in segment store only to be overwritten as described below.

In addition, tree management module 214 can also send an instruction to LSM tree 216 to delete the record of the corresponding segment ID and hash value for the deleted block, i.e., the entire record of the block is deleted from LSM tree 216. Tree management module 214 can also send an instruction to LSM tree 218 to delete the record of the corresponding segment ID and physical offset for the deleted block, i.e., the entire record of the block is deleted from LSM tree 218.

The tree management module 214 can then add an address of the unused block in the third LSM tree 220 (i.e., a "U-Map tree"). In this aspect, LSM tree 220 is a data structure configured to store a listing of physical offsets in segment store 260 of available blocks and can also store, for example, a physical size of the unused region. Advantageously, by updating each LSM tree 216, 218 and 220, data management module 206 is configured to perform a compacting algorithm of the data blocks stored in segment store 260 as will now be described.

Figure 5A:
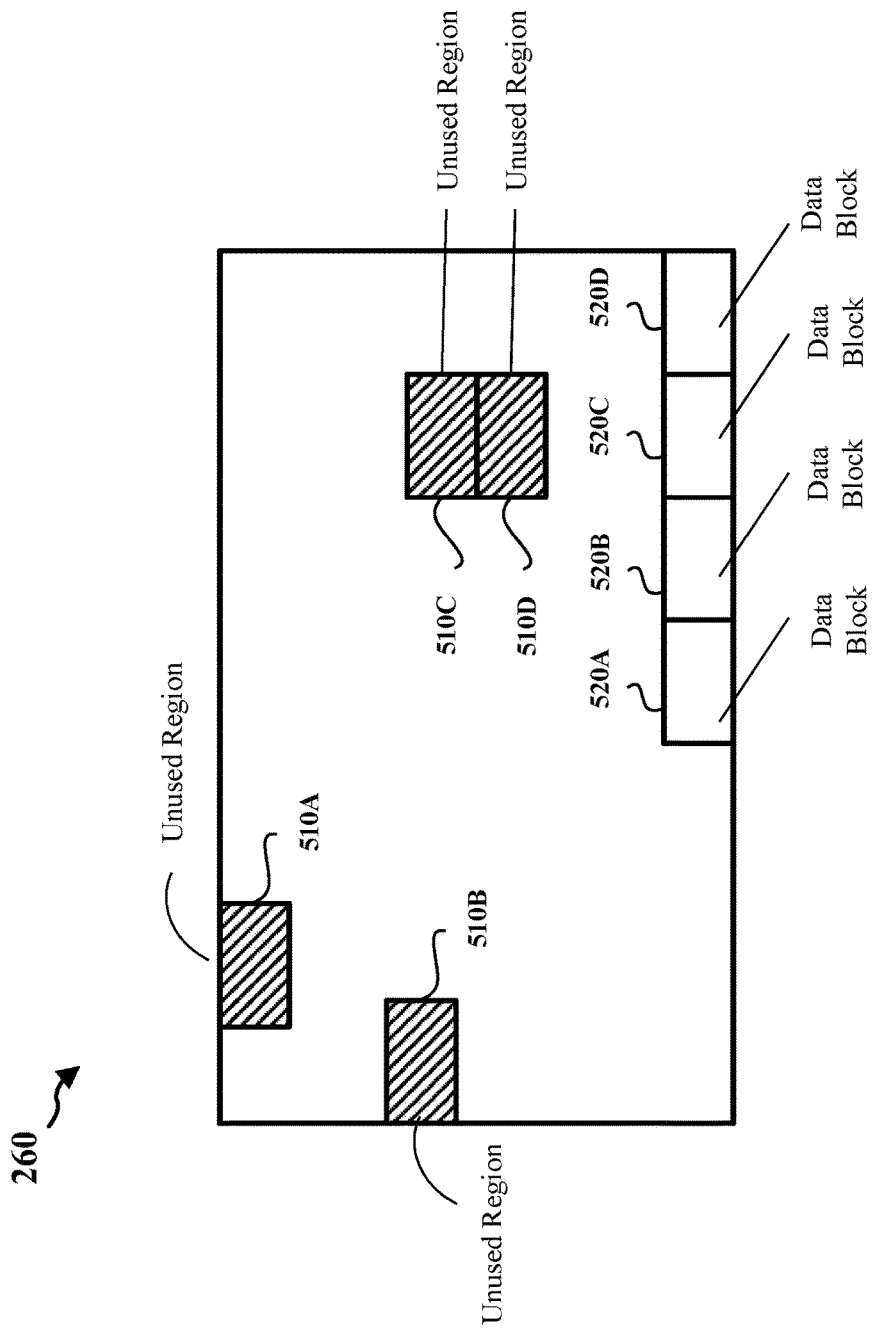

In particular, FIGS. 5A-5C depict block diagrams of a memory subjected to the compacting algorithm according to an exemplary method using log-structured merge trees as described herein. In general, it is shown that FIGS. 5A-5C illustrate memory (e.g., segment store 260), as an example. Thus, as shown in FIG. 5A, the memory 260 has undergone removal of data from unused regions 510A-510D, which are illustrated with cross hatching. As described above, data blocks from these sectors are removed if the count 219 corresponding to segment ID of the given data block becomes "0" according to the exemplary aspect. Thus, it is contemplated in FIG. 5A that unused regions 510A-510D correspond to regions where one or more data blocks have been removed from segment store 260.

Next, as described above, the tree management module 214 obtains information about the unused data regions 510A-510D and their respective addresses (i.e., the physical offsets) in segment store 260 and stores this information in the LSM tree 220 (i.e., T3 Index). In this aspect, the tree management module 214 further checks the size of the newly freed unused sectors 510A-510D. If one of the unused sectors 510A-510D is equal to or greater than a predetermined size limit (for example, 10 MB or more), the tree management module 214 and/or in conjunction with the storage module 224 copies data blocks from the end of the archive file to these unused regions. The end of the archive file cane be the one or more data blocks located at the last physical offset of the segment store 260 according to one example.

For example, the data blocks at the end of the segment store 260 are shown as data blocks 502A-520D. According to the exemplary algorithm, the storage module 224 is configured to select the first unused region, closest to the beginning of the archive (e.g., region 510A), and copy into it data from block 520A, which is located at the end of the archive. Next, the storage module 224 selects the second unused region 510B and copies data block 520B into this region. This process is repeated for each unused region having sufficient size where a data block can be copied as shown in FIG. 5B. While data block 520A is shown to be copied into 510A and so forth, in an alternative aspect, the last data block (e.g., data block 520D) can be copied into the first available unused region 510A, and then the second to last data block 520C can be copied into the second available unused region 510B, and so forth.

After each data block is copied into an unused region, the tree management module 214 is configured to update the records in LSM tree 220 (i.e., T3 Index) to indicate that each such region is no longer marked as unoccupied or unused. Furthermore, storage module 224 is configured to provide an updated physical offset of the data block to the tree management module 214. The tree management module 214 in turn updates the records in LSM tree 218 to reflect the correct physical offset associated with the segment ID for this moved data block. It should be appreciated that the count will stay the same at this stage as the reference of backups to this block has not changed.

Finally, as shown in FIG. 5C, the storage module 224 is configured to remove the data blocks 520A-520D from their original sectors at the end of the archive 260 since copies have been made in corresponding regions 510A-510D. The storage module 224 then truncates (i.e., "cuts off") the archive (e.g., segment sector 260) so that all the data in the archive is placed in a more compact form using the previously unused or freed up regions 510A-510D. Advantageously, this process reduces total memory use and shortens read times of the backup data as described above.

Figure 6:
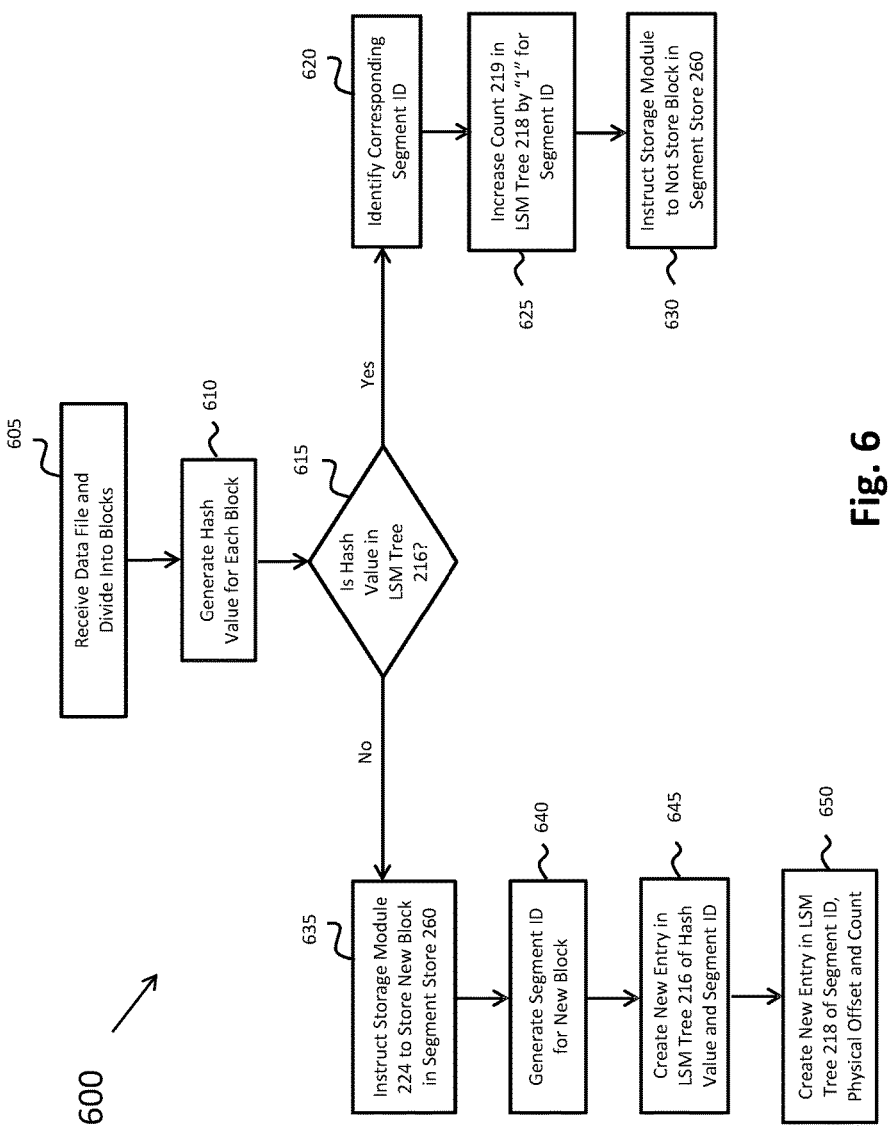
FIG. 6 illustrates a flowchart of a method for data storage using log-structured merge trees according to an exemplary aspect.

FIG. 6 illustrates a flowchart of a method for data storage using log-structured merge trees according to an exemplary aspect. The method 600 may be implemented by the system 200 shown in FIG. 2. It will be understood that one or more operations may be omitted and/or contemporaneously performed.

At step 605, a file is received for data backup and divided into one or more blocks (e.g., "chunking"). Next, at step 610, the hash module 212 generates a hash value associated with each data block. For example, the hash module 212 may calculate a first hash value for the first data block 202a and so forth.

Furthermore, at step 615, the tree management module 214 searches LSM tree 216 to determine whether a corresponding hash value has already been index in an index table of LSM tree 216. If so, the method proceeds to step 620 where the tree management module 214 identifies the corresponding segment ID for the hash value. An exemplary index table is shown in FIG. 3 as described above. Because the segment ID has already been stored, the tree management module 214 will know that a copy of the received data block has been stored in segment store 260. As a result, this means that a second (or subsequent) backup file includes the backup copy. Thus, at step 625, the tree management module 214 identifies the segment ID in LSM tree 218 (e.g., as shown in FIG. 4) and increases the corresponding count value 219 by "1". Finally, at step 630, the tree management module 214 instructs the storage module 224 to not store a copy of the data block in segment store 260.

Referring back to step 615, if the hash value is not found in LSM tree 216, then the method proceeds to step 635. In one aspect, the system determines if the size of the particular data value (i.e., the free space) is greater than a predetermined threshold. In other words, the system determines whether there is sufficient space to move data from the end of archive to the sectors that were freed up. Moreover, because the hash value was not identified, the tree management module 214 identifies that the data block is not currently stored in segment store 260. As such, the tree management module 214 instructs the storage module 224 to store the new block in segment store 260 at step 635 if the size of the block is greater than or equal to the size required for storing the new block, according to the exemplary aspect. Moreover, the tree management module 214 can generate a new segment ID for this data block at step 640 and control the archive module 222 to write the segment ID corresponding to the matching hash value in an archive 240.

Moreover, at step 645, the tree management module 214 can create a new entry in the index table of LSM tree 216 that includes the hash value and associated segment ID for the newly-stored data block. Finally, at step 650, the tree management module 214 can create a new entry in the index table of LSM tree 218 that includes segment ID and associated physical address, i.e., the physical offset received from storage module 224 that is associated with the stored data block. For example, the storage module 224 may determine a physical offset of the newly added data block in segment store 260 and provide this address to the tree management module 214.

Figure 7:
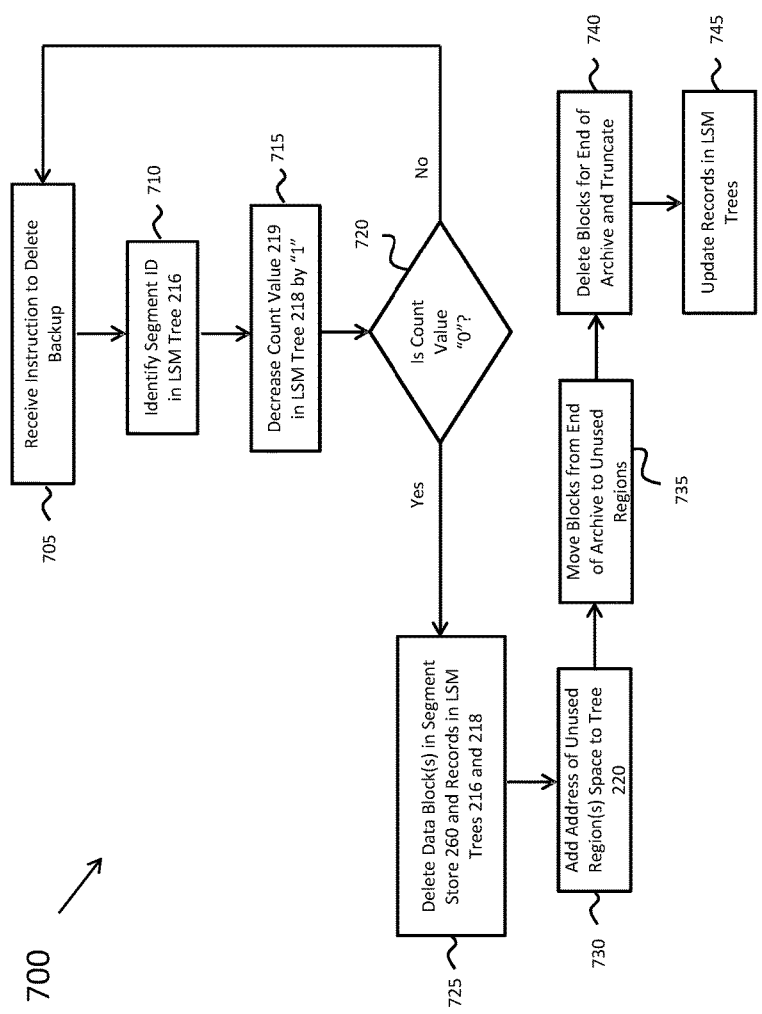
FIG. 7 depicts a flowchart for a method of compacting a data archive according to an exemplary method using log-structured merge trees as described herein.

FIG. 7 depicts a flowchart for a method of compacting a data archive according to an exemplary method using log-structured merge trees as described herein. The method 700 reflects the process shown om FIGS. 5A-5C and may be implemented by the system 200 shown in FIG. 2. It will be understood that one or more operations may be omitted and/or contemporaneously performed.

As shown, initially at step 705, the system 200 receives an instruction or indication that a data backup is no longer needed. At step 710, the tree management module 214 identifies the one or more segment IDs in LSM tree 216 and, at step 715, decreases the count value 219 in LSM tree 218 by "1". At step 720, the tree management module 214 determines if the count value is "0". If not, no further action is taken and the method can return to step 705 and/or step 605 of FIG. 6, as should be appreciated to one skilled in the art.

Alternative, if at step 720 the count value is determined to be "0", the method proceeds to steps 725 where the one or more data blocks in segment store 260 are deleted (or identified as unused space). In addition, the corresponding records of this data block are updated in LSM trees 216 and 218. Then, at step 730, the address(es) of the unused space are added to tree 220. In one aspect, the storage module 224 also provides an indication of the size of the unused space. If one of the unused sectors (e.g., unused regions 510A-510D) is equal to or greater than a predetermined size limit (for example, 10 MB or more), the tree management module 214 and/or in conjunction with the storage module 224 copies data blocks from the end of the archive file to these unused regions at step 735. In one aspect, this step is done by overwriting the existing data since it is marked as unused.

Furthermore, at step 740, the storage module 224 is configured to remove the data blocks from their original sectors at the end of the segment store 260 since copies have been made in corresponding previously-unused regions. The storage module 224 then truncates the archive (e.g., segment sector 260) so that all the data in the archive is placed in a more compact form using the previously unused or freed up regions. Advantageously, this process reduces total memory use and shortens read times of the backup data as described above.

Finally, at step 745, after each data block is copied into an unused region, the tree management module 214 is configured to update the records in LSM tree 220 (i.e., T3 Index) to indicate that each such region is no longer marked as unoccupied or unused. Furthermore, storage module 224 is configured to provide an updated physical offset of the data block to the tree management module 214. The tree management module 214 in turn updates the records in LSM tree 218 to reflect the correct physical offset associated with the segment ID for this moved data block.

Figure 8:
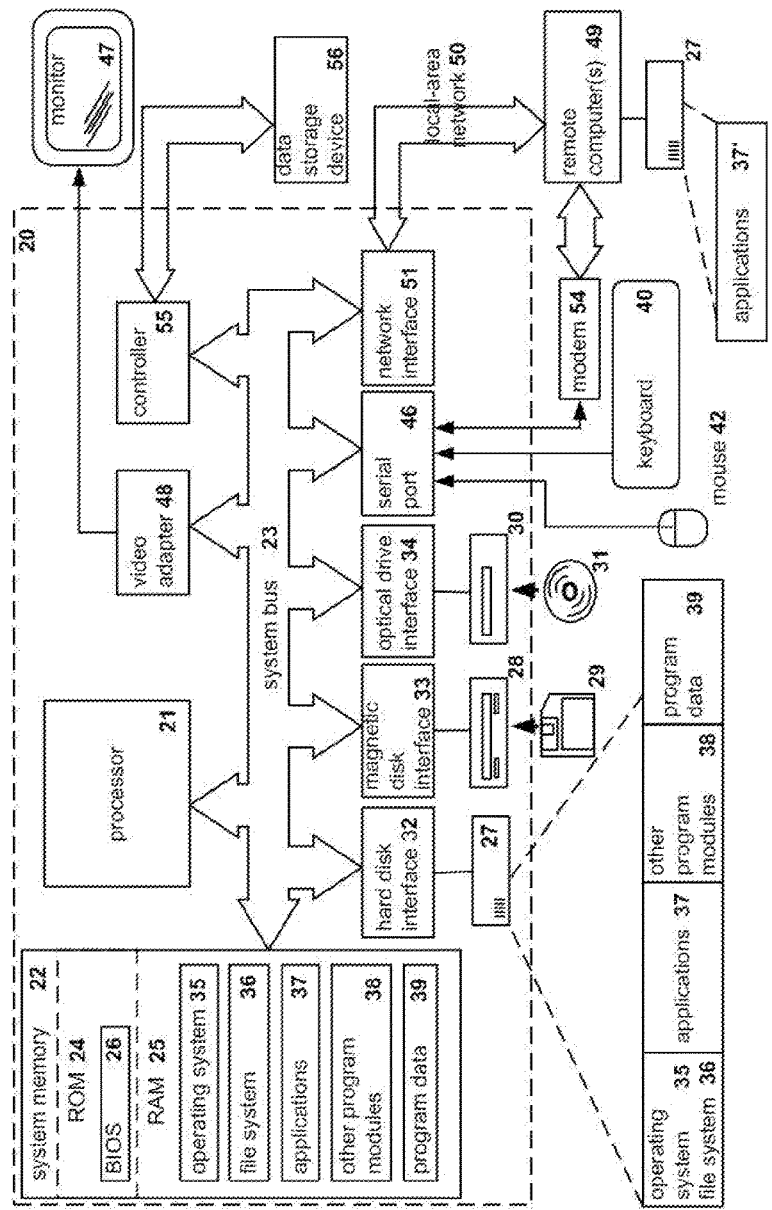
FIG. 8 illustrates an example of a general-purpose computer system on which the disclosed systems and method can be implemented.

FIG. 8 illustrates an example of a general-purpose computer system (which may be a personal computer or a server) on which the disclosed systems and method can be implemented according to an example aspect. It should be appreciated that the detailed general-purpose computer system can correspond to the system 200 described above with respect to FIG. 2 to implement the algorithms described above.

As shown, the computer system 20 includes a central processing unit 21, a system memory 22 and a system bus 23 connecting the various system components, including the memory associated with the central processing unit 21. The central processing unit 21 can correspond to the data management module 206 of FIG. 2 and the system memory 22. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20. Moreover, it is noted that any of the storage mechanisms can correspond to segment store 260 and/or archive 240 of FIG. 2, according to an exemplary aspect as would be appreciated to one skilled in the art.

The present disclosure provides the implementation of a system that uses a hard disk 27, a removable magnetic disk 29 and/or a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55. Similar to above, it is noted that any of the storage mechanisms can correspond to segment store 260 and/or archive 240 of FIG. 2, according to an exemplary aspect as would be appreciated to one skilled in the art.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for data management, the method comprising:
    storing, in a data archive, a plurality of data blocks for backup data files;
    storing, in a first log-structured merge (LSM) tree, data values for each of the plurality of data blocks and corresponding segment identifiers for each of the data values;
    storing, in a second LSM tree, the segment identifiers for each of the data values and associated physical addresses in the data archive for each of the plurality of data blocks;
    determining, by a processor, that at least one of the plurality of data blocks contains unused space that exceeds a predetermined threshold;
    storing, in a third LSM tree, the physical address in the data archive of the at least one data block that contains unused space;
    copying at least one of the plurality of data blocks at an end position of the data archive to memory space at the physical address in the data archive identified in the third LSM tree; and
    deleting the at least one data block at the end position of the data archive to truncate the data archive.

2. The method of claim 1, further comprising storing, in the second LSM tree, a count value for each of the segment identifiers, wherein the count value indicates a number of backup data files that reference the respective data block associated with the corresponding segment identifier.

3. The method of claim 2, further comprising:
    receiving, at least one additional data block for an additional backup data file;
    creating a data value of the at least one additional data block;
    searching, in the first LSM tree, for a corresponding data value of the created data value of the at least one additional data block; and
    upon finding an existing data value in the first LSM tree that matches the created data value of the at least one additional data block, increasing the count value by 1 in the second LSM tree that corresponds to the segment identifier associated with the existing data value.

4. The method of claim 2, further comprising decreasing the count value by one upon receiving a notification that one of the backup data files no longer references the respective data block associated with the corresponding segment identifier.

5. The method of claim 4, wherein the determining that the at least one data block is no longer referenced by all of the backup data file comprises determining that the count value of the segment identifier associated with the physical address of the at least one data block is zero.

6. The method of claim 1, further comprising:
- deleting, from the first LSM tree, the data values and the corresponding segment identifiers for each of the plurality of data blocks that is determined to no longer being referenced by all of the backup data file; and
- deleting, from the second LSM tree, the segment identifiers and the corresponding physical addresses for each of the plurality of data blocks that is determined to no longer being referenced by all of the backup data file.

7. The method of claim 1, further comprising deleting, from the third LSM tree, the physical address in the data archive of the at least one data block that is no longer referenced by all of the backup data file after the at least one of the plurality of data blocks at the end position of the data archive has been copied to the memory space at the physical address in the data archive.

8. The method of claim 1, wherein there determining of the at least one data block that contains unused space further comprises determining that the one data block is no longer referenced by all of the backup data file.

9. A computer-implemented system for data management, the system comprising:
- a data archive configured to store a plurality of data blocks for backup data files; and
- a processor configured to:
  - store, in a first log-structured merge (LSM) tree, data values for each of the plurality of data blocks and corresponding segment identifiers for each of the data values,
  - store, in a second LSM tree, the segment identifiers for each of the data values and associated physical addresses in the data archive for each of the plurality of data blocks,
  - determine that at least one of the plurality of data blocks contains unused space that exceeds a predetermined threshold;
  - store, in a third LSM tree, the physical address in the data archive of the at least one data block that contains unused space;
  - copy at least one of the plurality of data blocks at an end position of the data archive to memory space at the physical address in the data archive identified in the third LSM tree, and
  - delete the at least one data block at the end position of the data archive to truncate the data archive.

10. The system of claim 9, wherein the processor is further configured to store, in the second LSM tree, a count value for each of the segment identifiers, wherein the count value indicates a number of backup data files that reference the respective data block associated with the corresponding segment identifier.

11. The system of claim 10, wherein the processor is further configured to:
- create a data value of least one additional data block for an additional backup data file;
- search, in the first LSM tree, for a corresponding data value of the created data value of the at least one additional data block; and
- upon finding an existing data value in the first LSM tree that matches the created data value of the at least one additional data block, increase the count value by 1 in the second LSM tree that corresponds to the segment identifier associated with the existing data value.

12. The system of claim 10, wherein the processor is further configured to decrease the count value, in the second LSM tree, by one upon receiving a notification that one of the backup data files no longer references the respective data block associated with the corresponding segment identifier.

13. The system of claim 12, wherein the processor is further configured to determine that the at least one data block is no longer referenced by all of the backup data file by determining that the count value of the segment identifier associated with the physical address of the at least one data block is zero.

14. The system of claim 9, wherein the processor is further configured to:
- delete, from the first LSM tree, the data values and the corresponding segment identifiers for each of the plurality of data blocks that is determined to no longer being referenced by all of the backup data file; and
- delete, from the second LSM tree, the segment identifiers and the corresponding physical addresses for each of the plurality of data blocks that is determined to no longer being referenced by all of the backup data file.

15. The system of claim 9, wherein the processor is further configured to delete, from the third LSM tree, the physical address in the data archive of the at least one data block that is no longer referenced by all of the backup data file after the at least one of the plurality of data blocks at the end position of the data archive has been copied to the memory space at the physical address in the data archive.

16. The system of claim 9, wherein the processor is further configured to determine that the one data block is no longer referenced by all of the backup data file.

17. A non-transitory computer readable medium comprising computer executable instructions for performing data management, including instructions for:
- storing, in a data archive, a plurality of data blocks for backup data files;
- storing, in a first log-structured merge (LSM) tree, data values for each of the plurality of data blocks and corresponding segment identifiers for each of the data values;
- storing, in a second LSM tree, the segment identifiers for each of the data values and associated physical addresses in the data archive for each of the plurality of data blocks;
- determining that at least one of the plurality of data blocks contains unused space that exceeds a predetermined threshold;
- storing, in a third LSM tree, the physical address in the data archive of the at least one data block that contains unused space;
- copying at least one of the plurality of data blocks at an end position of the data archive to memory space at the physical address in the data archive identified in the third LSM tree; and
- deleting the at least one data block at the end position of the data archive to truncate the data archive.

18. The non-transitory computer readable medium of claim 17, further including instructions for storing, in the second LSM tree, a count value for each of the segment identifiers, wherein the count value indicates a number of backup data files that reference the respective data block associated with the corresponding segment identifier.

19. The non-transitory computer readable medium of claim 18, further including instructions for:
- receiving, at least one additional data block for an additional backup data file;
- creating a data value of the at least one additional data block;

searching, in the first LSM tree, for a corresponding data value of the created data value of the at least one additional data block; and upon finding an existing data value in the first LSM tree that matches the created data value of the at least one additional data block, increasing the count value by 1 in the second LSM tree that corresponds to the segment identifier associated with the existing data value.

20. The non-transitory computer readable medium of claim 18, further including instructions for decreasing the count value by one upon receiving a notification that one of the backup data files no longer references the respective data block associated with the corresponding segment identifier.

21. The non-transitory computer readable medium of claim 20, wherein the determining that the at least one data block is no longer referenced by all of the backup data file comprises determining that the count value of the segment identifier associated with the physical address of the at least one data block is zero.

22. The non-transitory computer readable medium of claim 17, further including instructions for:

deleting, from the first LSM tree, the data values and the corresponding segment identifiers for each of the plurality of data blocks that is determined to no longer being referenced by all of the backup data file;

deleting, from the second LSM tree, the segment identifiers and the corresponding physical addresses for each of the plurality of data blocks that is determined to no longer being referenced by all of the backup data file; and deleting, from the third LSM tree, the physical address in the data archive of the at least one data block that is no longer referenced by all of the backup data file after the at least one of the plurality of data blocks at the end position of the data archive has been copied to the memory space at the physical address in the data archive.

* * * * *